United States Patent
Horvath

(10) Patent No.: US 11,448,356 B2
(45) Date of Patent: Sep. 20, 2022

(54) ROTATABLE LOCKDOWN MERCHANDISE SECURITY APPARATUS

(71) Applicant: Sennco Solutions, Inc., Plainfield, IL (US)

(72) Inventor: Daniel Horvath, Plainfield, IL (US)

(73) Assignee: SENNCO SOLUTIONS, INC., Plainfield, IL (US)

( * ) Notice: Subject to any disclaimer, the term of this patent is extended or adjusted under 35 U.S.C. 154(b) by 0 days.

(21) Appl. No.: 16/804,573

(22) Filed: Feb. 28, 2020

(65) Prior Publication Data
US 2021/0270410 A1 Sep. 2, 2021

(51) Int. Cl.
- *F16M 11/00* (2006.01)
- *F16M 11/10* (2006.01)
- *F16M 11/04* (2006.01)
- *E05B 73/00* (2006.01)

(52) U.S. Cl.
CPC ......... *F16M 11/105* (2013.01); *F16M 11/041* (2013.01); *E05B 73/0082* (2013.01)

(58) Field of Classification Search
CPC .... F16M 11/041; F16M 11/105; F16M 13/00; G06F 1/1605
See application file for complete search history.

(56) References Cited

U.S. PATENT DOCUMENTS

| | | | |
|---|---|---|---|
| 4,656,848 A | 4/1987 | Rose | |
| 5,052,199 A | 10/1991 | Derman | |
| 5,169,114 A | 12/1992 | Oneill | |
| 5,692,722 A | 12/1997 | Lundagaards | |
| 6,443,417 B2 | 9/2002 | Galant | |
| 7,737,844 B2 | 6/2010 | Scott | |
| D674,803 S | 1/2013 | Westrup | |
| 8,526,176 B2 | 9/2013 | Clark | |
| 8,711,553 B2 | 4/2014 | Trinh | |
| 8,727,192 B2* | 5/2014 | Lai | F16M 13/022 224/420 |
| 8,814,128 B2 | 8/2014 | Trinh | |
| 8,905,367 B2 | 12/2014 | Bury | |
| 8,998,048 B1* | 4/2015 | Wu | F16M 13/02 224/420 |
| 9,097,380 B2 | 8/2015 | Wheeler | |

(Continued)

OTHER PUBLICATIONS

4-Point ERS Large Tablet Scorpion, Scorpion Security Products; https://www.scorpionsecurityproducts.com/product/4-point-ers-large-tablet-scorpion/; 2018; 3 pp.

(Continued)

*Primary Examiner* — Amy J. Sterling
(74) *Attorney, Agent, or Firm* — Lempia Summerfield Katz LLC

(57) ABSTRACT

An apparatus for securely displaying a product includes a cradle assembly including a base plate and a plurality of plates slidably engaged with the base plate, each plate of the plurality of plates including an arm to engage a respective side of the product, and a post supporting the cradle assembly, the post including first and second sections, one of the first and second sections being fixedly connected to the base plate. The first section includes a projection, and the second section includes a guide in which the projection is disposed to control rotation of the first and second sections relative to one another and re-orient the cradle assembly.

17 Claims, 7 Drawing Sheets

(56) References Cited

U.S. PATENT DOCUMENTS

| | | |
|---|---|---|
| 9,161,466 B2 | 10/2015 | Huang |
| 9,163,433 B2 | 10/2015 | Sedon |
| 9,285,832 B2 | 3/2016 | Galant |
| 9,727,085 B2 | 8/2017 | Weldon |
| 9,936,823 B2 | 4/2018 | Galant |
| 9,972,178 B2 | 5/2018 | Richardson |
| 10,750,885 B2 * | 8/2020 | Hyma ................. E05B 73/0082 |
| 2012/0047972 A1 | 3/2012 | Grant |
| 2013/0301216 A1 | 11/2013 | Trinh |
| 2014/0092531 A1 | 4/2014 | Trinh |
| 2014/0226298 A1 | 8/2014 | Palmer |
| 2015/0050077 A1 * | 2/2015 | Huang ................. F16M 11/041 403/322.1 |
| 2015/0211675 A1 * | 7/2015 | Shyu ................... F16M 11/105 248/125.7 |
| 2015/0336495 A1 | 11/2015 | Maslakow |
| 2018/0136697 A1 * | 5/2018 | Lee ....................... G06F 1/1669 |
| 2019/0309897 A1 * | 10/2019 | Ehlis Pirretas ...... F16M 13/022 |
| 2020/0400268 A1 * | 12/2020 | Yang ...................... F16M 11/40 |
| 2020/0409410 A1 * | 12/2020 | Kawaguchi .............. H04R 5/02 |

OTHER PUBLICATIONS

HS80 High Theft Merchandise Security, InVue Security Products, 2016; 6 pp.

\* cited by examiner

ROTATABLE LOCKDOWN MERCHANDISE SECURITY APPARATUS

BACKGROUND OF THE DISCLOSURE

Field of the Disclosure

The disclosure relates generally to security of merchandise on retail display.

Brief Description of Related Technology

Product merchandise is routinely displayed in retail environments with a security mechanism to deter theft. In some cases, the security mechanism is a tether that ties the merchandise to a display fixture. In other cases, the security mechanism is a security device, such as an electronic tag, affixed to the product and configured to support a proximity detection scheme. In either case, the security mechanism attempts to deter theft while providing a consumer an opportunity to evaluate the product. For instance, the security device may allow the consumer to lift or otherwise inspect the product to assess its function and/or aesthetics. Allowing the consumer to lift the product gives the consumer a better opportunity to assess the weight and feel of the product, as well as interact with the various features and other aspects of the product.

Would-be thieves of consumer electronics in retail environments have become increasingly less deterred by audible alarms that sound when a product is forcibly removed from a display. In many cases, thieves enter retail establishments, forcibly remove the entire security mounting solution and the displayed product from the display, and quickly exit the retail establishments with the alarms sounding. Many existing security solutions in retail establishments use light-duty plastic mounting brackets that are relatively easy to break free from a display fixture. As a result, thieves easily remove thousands of dollars of product from the stores in a matter of seconds.

SUMMARY OF THE DISCLOSURE

In accordance with one aspect of the disclosure, an apparatus for securely displaying a product includes a cradle assembly including a base plate and a plurality of plates slidably engaged with the base plate, each plate of the plurality of plates including an arm to engage a respective side of the product, and a post supporting the cradle assembly, the post including first and second sections, one of the first and second sections being fixedly connected to the base plate. The first section includes a projection, and the second section includes a guide in which the projection is disposed to control rotation of the first and second sections relative to one another and re-orient the cradle assembly In accordance with another aspect of the disclosure, an apparatus for securely displaying a product includes a cradle assembly including a base plate and a plurality of plates slidably engaged with the base plate, each plate of the plurality of plates including an arm to engage a respective side of the product, and a post supporting the cradle assembly, the post including first and second sections, the second section being fixedly connected to the base plate. The first section includes a pin and a projection. The second section includes a hole in which the pin is disposed to define an axis of rotation of the first and second sections relative to one another for re-orientation of the cradle assembly. The second section includes a guide in which the projection is disposed to limit the rotation.

In connection with any one of the aforementioned aspects, the apparatus described herein may alternatively or additionally include any combination of one or more of the following aspects or features. The projection includes a pin, the pin defining an axis of the rotation. The guide includes a hole in the second section in which the pin is disposed. The pin includes a threaded bolt. The projection includes a stud. The guide includes a channel in the second section in which the stud travels during the rotation. The projection is a first projection of a plurality of projections of the first section. The guide is a first guide of a plurality of guides of the second section. Each projection of the plurality of projections is disposed in a respective guide of the plurality of guides to control the rotation. The plurality of guides include a slot in which one of the plurality of projections is disposed. The slot is curved to define an arc that restricts the rotation to a predetermined range. The slot is configured to re-orient the cradle assembly such that the product can rotate between a portrait orientation and a landscape orientation. The second section includes an end cap in which the guide is formed. The base plate is welded to the second section. The apparatus further includes a washer disposed between the first and second sections and engaged by the projection, wherein the washer is configured to establish a friction level for the rotation. The first section includes a bolt that defines an axis of the rotation. The apparatus includes a nut disposed in the second section for threaded engagement with the bolt. The apparatus further includes a washer disposed between the nut and the second section to establish a friction level for the rotation. The first and second sections are cylindrical. The second section includes an end cap in which the hole and the guide are formed. The guide includes a curved slot that defines an arc that restricts the rotation to a predetermined range. The slot is configured to re-orient the cradle assembly such that the product can rotate between a portrait orientation and a landscape orientation. The pin includes a threaded bolt. The apparatus further includes a nut disposed in the second section for threaded engagement with the bolt

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
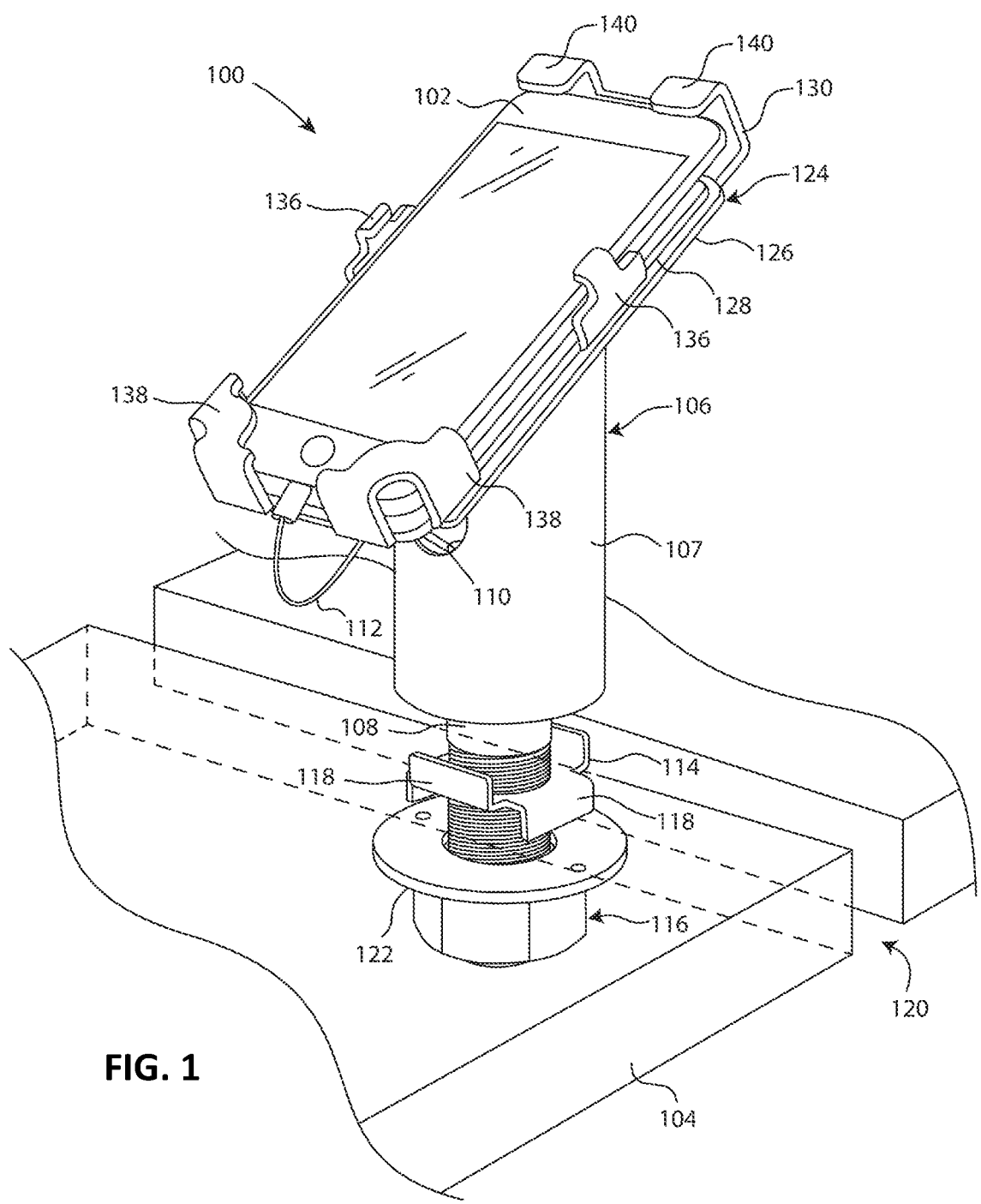
FIG. 1 is a front, perspective view of an apparatus for securely displaying a product in accordance with one example.

The disclosed apparatuses are susceptible of embodiments in various forms. Specific embodiments of the invention are illustrated in the drawing (and will hereafter be described) with the understanding that the disclosure is intended to be illustrative, and is not intended to limit the invention to the specific embodiments described and illustrated herein.

DETAILED DESCRIPTION OF THE DISCLOSURE

An apparatus that secures merchandise on display is described. The merchandise is often an electronic device, but other products may be secured. The apparatus secures, or locks down, the merchandise or product to a display fixture in a rugged manner. The apparatus may thus be used in retail and other environments to securely display products while eliminating or substantially reducing theft. The retail environment may consequently not need to rely on tethers, security tags, proximity sensors, or other security mechanisms to deter theft. Although described as a stand-alone security solution, the disclosed apparatus may be used in conjunction with other security mechanisms.

The apparatus provides a heavy-duty mounting for securing the product to the display fixture, avoiding the limitations of other mounting apparatuses. Traditional mounting apparatuses are relatively easy to break free from a display fixture. For instance, a thief can easily break a plastic mounting apparatus and remove the displayed product. The disclosed heavy-duty lock-down mounting apparatus cannot be easily removed from the display. The disclosed apparatus includes a plate-based cradle assembly with a lock to securely hold the product in place. In one aspect, the apparatus is constructed of tamper-proof, heat-treated steel. The tamper-proof, heat-treated steel is welded to wraparound the product and has no breaks, thereby preventing the corner to be bent away from the product. The tamper-proof, heat-treated steel also prevents the apparatus from being removed from the display fixture by a thief.

Mounting apparatuses must secure the products while also allowing the products to be viewed and interacted with. The disclosed apparatus provides a heavy-duty mounting for securing the product to the display fixture while still allowing the product to be viewed and interacted with by potential customers and/or other users. For instance, the plate-based cradle assembly has arms that hold on to the edges of the product without covering the front or sides of the product that require user interaction.

Some products work or look best in either portrait mode or landscape mode. The disclosed apparatus also enables the product to be further interacted with by allowing the product to be rotated between a portrait orientation and a landscape orientation while maintaining the product secure and locked down without the need for additional security devices. This capability provides a great opportunity to create a better user interaction experience since it offers and additional screen layout with a simple turn of the product.

The apparatus is configured for convenient use despite its rugged nature. For instance, the plates of the cradle assembly are capable of being locked in position by a lock without forcing a user to use a tool. In some cases, the lock includes a spring-loaded push pin. The apparatus is also configured for convenient unlocking. For instance, an unlocking mechanism allows for easy removal of the product from the apparatus. In some cases, the unlocking mechanism includes a barrel lock option. The unlocking mechanism thus provides a convenient and secure solution to prevent theft while allowing authorized personnel to easily remove the product from the apparatus.

The disclosed apparatus is capable of being adjusted to hold a variety of products. For instance, the plates of the cradle assembly are slidably connected to a base plate to accommodate products with a variety of lengths and widths. In some cases, the plates of the cradle assembly are attached to the base plate using notched slots and held in place with set screws.

Although described and shown herein in connection with a smartphone, the disclosed apparatus is not limited to securing any particular type of product. The adjustable nature of the disclosed apparatus allows the dimensions of the product to vary considerably. A variety of electronic and non-electronic products may be secured via the disclosed apparatus.

Figure 2:
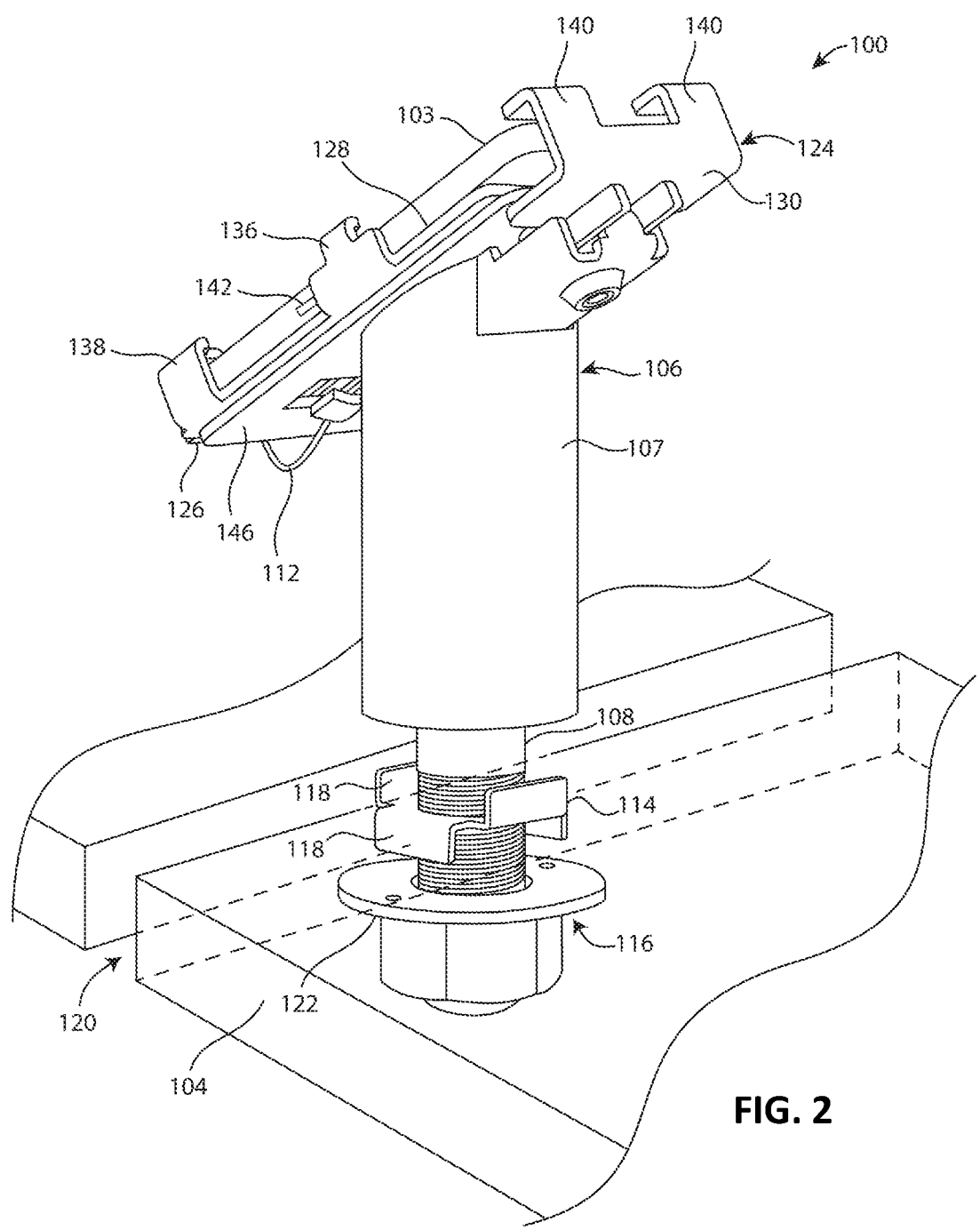
FIG. 2 is a rear, perspective view of the apparatus of FIG. 1 in connection with the display of another product of a different size.
Figure 3:
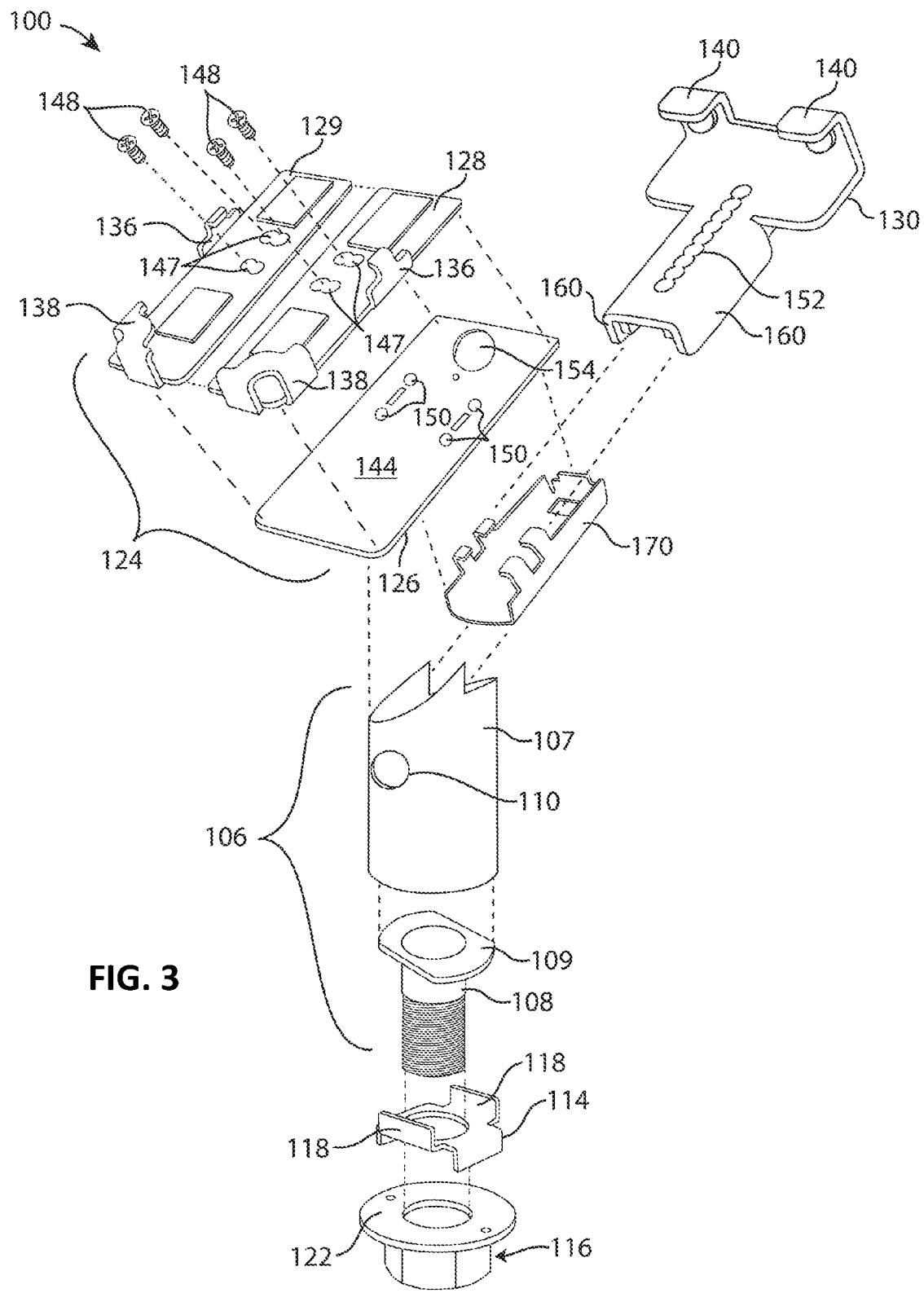
FIG. 3 is a front, perspective, exploded view of the apparatus of FIG. 1 to depict in greater detail a post and a cradle assembly of the apparatus in accordance with one example.

Turning to the drawing figures, FIGS. 1-3 depict an apparatus 100 configured for securely displaying product. The apparatus 100 is configured to accommodate products of different sizes. The lateral dimensions and/or thickness may vary. In this case, the apparatus 100 is depicted with a product 102 in FIG. 1, and a product 103 in FIG. 2. The products 102, 103 may be a smartphone or another electronic device. In the examples shown, the product 103 is thicker and wider than the product 102. Any one or more of the product dimensions may vary. The products 102, 103 may be displayed for sale and/or part of an exhibit or other display of items for sale. The nature of the products 102, 103 may vary. For example, the products 102, 103 may be a laptop, computer, tablet, smartwatch or other portable electronic product. In other cases, the apparatus 100 is used to display non-electronic products. The size, form factor, and other characteristics of the products 102, 103 may thus vary considerably.

The display may be in a store or other retail site or other environment. The retail display and environment may have other security monitoring systems in operation to prevent or deter theft of the products 102, 103 and other merchandise on display. For instance, a wireless security system may be provided, such as the system described in U.S. Patent Publication No. 2016/0307415 ("Apparatus, System and Method for Monitoring a Device within a Zone"), the entire disclosure of which is hereby incorporated by reference. Alternatively or additionally, tethers or other cable-based security measures may be used, including, for instance, cable-based apparatus having a retractable reel and other components for securing merchandise to a display fixture as described in U.S. Patent Publication No. 2014/0059828 ("Apparatus, System and Method for Securing, Attaching and/or Detaching a Device to a Fixture"), the entire disclosure of which is hereby incorporated by reference.

The apparatus 100 is configured to provide rugged security to lock-down products for display and/or products for use by a potential buyer. Such heavy-duty security may replace or augment the security measures established by other items in the retail environment. For instance, the apparatus 100 may provide redundancy by being implemented with the wireless security system described above. This redundancy may be useful in circumstances in which the wireless system fails or is otherwise disabled.

The apparatus 100 is configured to secure the product 102, 103 to a display fixture 104 of the retail environment. The apparatus 100 is mounted or otherwise connected to the display fixture 104. The apparatus 100 extends outward (e.g., upward) from the display fixture 104. In the example of FIG. 1, the display fixture 104 is a table, shelf, stand, or other horizontally oriented structure. The orientation and other characteristics of the display fixture 104 may vary from the example shown. For instance, the display fixture 104 may be vertically oriented such that the apparatus 100 extends laterally outward rather than upward from the display fixture 104.

The apparatus 100 includes a post 106. The post 106 connects the product 102, 103 to the display fixture 104. In the example shown, the connection establishes an elevated position for the product 102, 103 relative to the display fixture 104. In other cases, the post 106 may space the product 102, 103 from the display fixture 104 in other directions. The orientation of the post 106 may thus vary.

In the example of FIGS. 1-3, the post 106 includes a tube 107, a rod 108, and a weld plate 109 (FIG. 3) to connect the tube 107 and the rod 108. The rod 108 is disposed within the tube 107. The rod 108 extends outward from the tube 107 to engage the display fixture 104. To that end, the rod 108 may be threaded. In other cases, the post 106 includes multiple rods. For example, a pair of rods may be disposed within and extending from the tube 107 to engage the display fixture. In the example of FIGS. 1-3, the rod 108 is a partially-threaded rod. A non-threaded part of the rod 108 is welded or otherwise secured to the weld plate 109. The weld plate 109 is, in turn, welded or otherwise secured to the tube 107, thereby connecting the rod 108 to the tube 107 to form the post 106. In other cases, the weld plate 109 may be secured to the tube 107 via a press fit connection.

The post 106 may be configured to accommodate one or more features of the display. For instance, the post 106 may be configured to facilitate electrical, data or other connections to the product 102, 103. In the example shown, the post 106 includes a routing channel or other interior space that terminates in an opening 110 in the tube 107 to allow a cable 112, such as a product charging or other power cable, to be connected to the product 102, 103. After exiting the opening 110, the cable 112 may be disposed in one or more cable guides, such as a guide hook in a base plate shown in FIG. 2. The cable guides and the routing channel may be used for additional or alternative purposes. For instance, in examples with an electronic lock, the routing channel may be used to accommodate a power cable for the electronic lock.

The post 106 may be composed of one or more materials to provide a rugged connection to the display fixture 104. In this example, one or more components of the post 106 are constructed of a metal or other rigid material, such as heat-treated steel. The steel (or other material) may have a gauge and/or other characteristics to render the post 106 tamper-proof. The use of steel or other metal materials allows the components of the post 106 to be welded to one another. The welding may be useful to reduce or eliminate breaks or other spacing between the components. The lack of breaks prevents tampering. A wide variety of other heavy-duty materials may be used, such as aluminum or high-strength plastic.

The construction, configuration, and other characteristics of the post 106 may vary considerably from the example shown. For instance, the post 106 may include additional, fewer, or alternative components. The post 106 may not include the tube 107 and/or the weld plate 109 in some cases. Any number of the components of the post 106 may be integrated with one another to any desired extent. For example, some or all of the components of the post 106 may be machined or otherwise formed as a single component.

In the example of FIGS. 1-3, an upper end of the post 106 is angled to orient the product 102, 103 at an angle as shown. The angle may vary. The upper end of the post 106 may vary accordingly. The upper end may also include a notch to accommodate a lock mount as described below.

The shape and dimensions of the post 106 may vary in other ways. For example, the post 106 may have a different cross-section, such as cylindrical, rectangular, etc. The diameter or other lateral dimension(s) of the post 106 may be smaller or larger than the lateral dimension(s) of the product 102, 103.

The apparatus 100 includes one or more components directed to securing the post 106 to the display fixture 104. The components may be engaged with the rod 108 or other component of the post 106. In the example of FIGS. 1-3, the apparatus 100 includes an anti-rotation washer 114 and a nut 116. The anti-rotation washer 114 prevents the post 106 from rotating relative to the nut 116. The anti-rotation washer 114 is threadably engaged with the threaded rod 108 and has a plurality of flanges 118 configured to engage a channel 120 (FIGS. 1 and 2) in the display fixture 104. Any one of the flanges 118 not engaged in the channel 120 in the display fixture 104 may be disposed in the space between the weld plate 109 and the tube 107. The channel 120 may be a slot or gap in the display fixture 104. For example, the channel 120 may extend across the width of a display table. The anti-rotation washer 114 thus prevents the apparatus 100 from being rotated and unscrewed from the display fixture 104.

Other anti-rotation mechanisms may additionally or alternatively be used. For example, a jam nut may be threadably engaged with the rod 108. The anti-rotation mechanism may vary in connection with one or more characteristics of the display fixture 104. For instance, an anti-rotation O-ring may be used in connection with display fixtures having a round opening rather than the channel 120. Rotation may alternatively or additionally be prevented via use of multiple rods.

The apparatus 100 may include additional or fewer components directed to securing the post 106 to the display fixture 104. For instance, the nut 116 may be the sole mechanism for securing the post 106 to the display fixture 104. In those and other cases, the nut 116 may include a washer 122 welded or integrally formed with the remainder of the nut 116. As shown in FIGS. 1-3, the washer 122 may include holes for set screws. After the nut 116 is tightened to mount the post 106, the set screws are screwed into the display fixture 104, thereby providing additional security.

The apparatus 100 may include additional components directed to securing the post 106 to a permanent fixture. For instance, the post 106 may be secured to a wall. For example, the anti-rotation washer 114 may be tethered to a stud in the wall or other fixture of the retail environment. In some cases, the tether may be a steel cable. In some cases, one or more of the flanges 118 of the anti-rotation washer 114 may have holes through which the cable passes. A tether other than a steel cable may be used. The tether may engage alternative or additional washers or other elements of the post 106. In such cases, the washer or other element may have a hole through which the cable passes.

The apparatus 100 includes a cradle assembly 124 supported by the post 106. The cradle assembly 124 is configured to engage and hold the product 102, 103 in place. One or more components of the cradle assembly 124 are welded or otherwise fixedly secured to the post 106. The cradle assembly 124 may be considered to be or include a set of brackets that engage the product 102, 103. The positioning of the brackets or other components of the cradle assembly 124 is adjustable to accommodate products of various sizes.

Adjustment of the cradle assembly 124 involves an arrangement of sliding plates. As shown in FIGS. 1-3, the cradle assembly 124 includes a base plate 126 and a plurality of plates 128, 129 (FIG. 3), 130. The base plate 126 is welded or otherwise secured to the post 106. The plates 128-130 are slidably engaged with the base plate 126. The plates 128-130 slide laterally inward and outward to adjust the lateral dimension(s) of the cradle assembly 124 and, in so doing, engage the product 102, 103.

The plate arrangement may include two or more abutting plates. In the example of FIGS. 1-3, the plates 128, 129 are disposed as a pair of abutting plates. In the example shown, the plates 128, 129 engage opposite lateral sides of the product 102, 103. The pair of plates 128, 129 may accordingly be referred to herein as lateral plates. The lateral plates 128, 129 may also engage a bottom side of the product 102, 103, as described below.

The plate 130 engages a top side of the product 102, 103. The plate 130 may accordingly be referred to herein as a top plate.

The plates 128-130 are not entirely planar. As described below, each plate 128-130 includes one or more arms (e.g., bracket arms) that project outward from the plane of the plate 128-130. Each arm engages one or more sides of the product 102, 103. The term "plate" is accordingly used herein to include objects having at least a planar portion or segment. The planar portions of the plates 128-130 allow the plates 128-130 to slide relative to one another and relative to the base plate 126.

Figure 4:
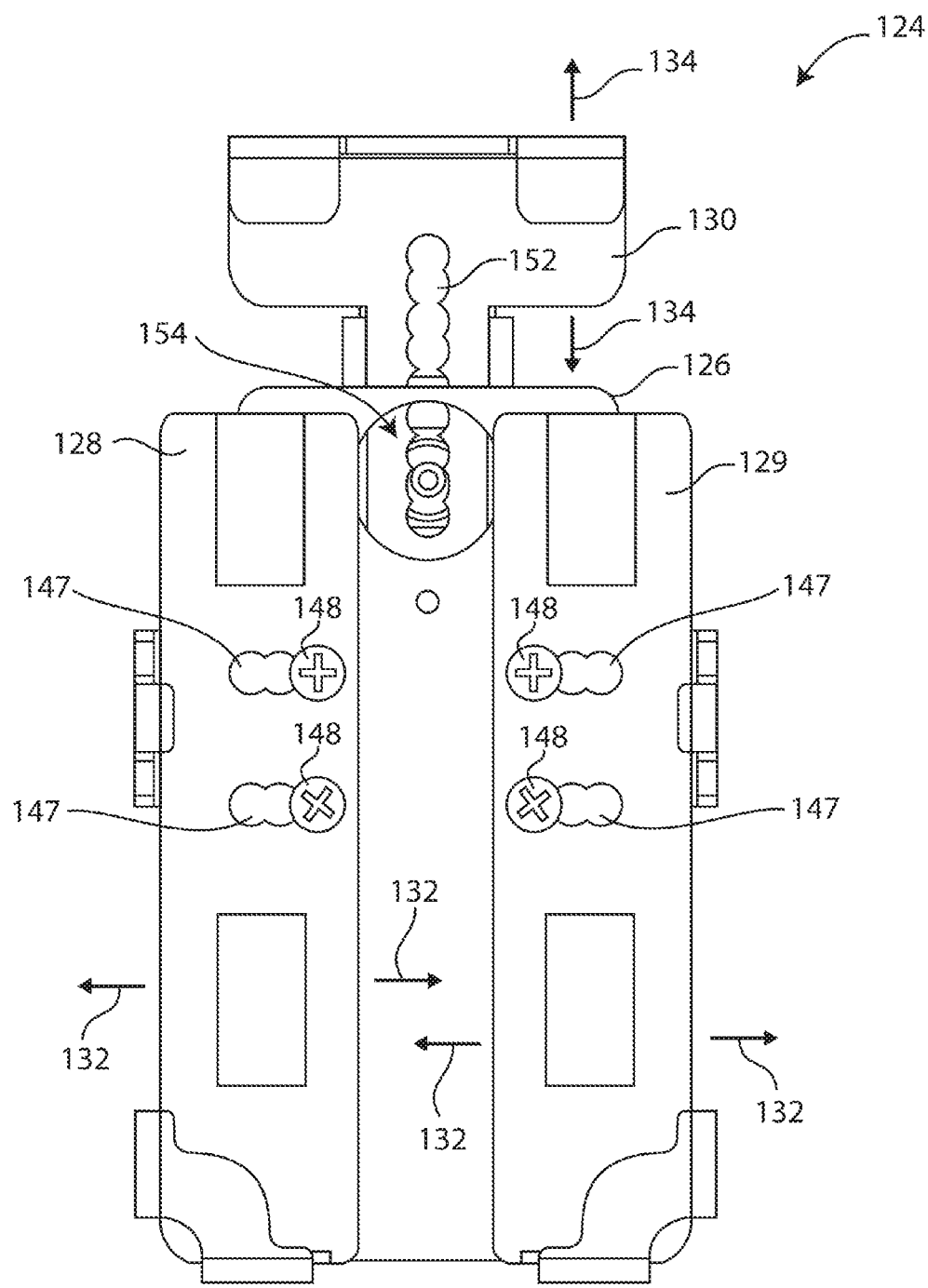
FIG. 4 is a front, elevational view of a cradle assembly to depict the adjustability of the cradle assembly in accordance with one example.

The plates 128-130 slide in multiple directions to accommodate multiple dimensions (e.g., height, width) of the product 102, 103. In this example, as shown in FIG. 4, the pair of lateral plates 128, 129 slide along a lateral axis 132 relative to one another to adjust a first lateral dimension of the cradle assembly 124. The lateral axis 132 corresponds with a side-to-side (e.g., left-to-right) dimension of the product 102, 103. In other cases, the pair of lateral plates 128, 129 move in a direction offset from the lateral axis 132. The top plate 130 slides along a lateral axis 134 to adjust another lateral dimension of the cradle assembly 124. The lateral axis 134 corresponds with the top-to-bottom (e.g., height) dimension of the product 102, 103. The lateral axis 134 is transverse to the lateral axis 132.

The sliding adjustment of the plate arrangement allows respective arms (e.g., bracket arms) of the plates 128-130 to engage the product 102, 103. Each arm engages one or more sides of the product 102, 103. In the example of FIGS. 1-3, each of the lateral plates 128, 129 includes a respective side arm 136 and a respective corner bracket arm 138. Additional, fewer or alternative arms may be included. For instance, the lateral plates 128, 129 may not include the side arms 136 in other cases. The top plate 130 includes a pair of bracket arms 140 that engage a top side of the product 102, 103. The top plate 130 may include additional, fewer or alternative arms. For instance, the arms 140 may be configured as corner bracket arms.

The arms of one or more of the plates 128-130 may be positioned to facilitate the display of the product 102, 103. For instance, the arms may not substantially cover the front or sides of the product 102, 103. The arms may be positioned to not obstruct access to volume control and other side buttons of the product 102, 103. Various ports (e.g., input/output ports) may be similarly free from obstruction by the arms. All buttons and inputs of the product 102, 103 may thus be accessed. The product 102, 103 may thus be viewed and interacted with in a normal fashion. The cradle assembly 124 thus secures the product 102, 103 while not obstructing the functionality thereof.

One or more of the arms, however, may be positioned to prevent, limit or otherwise obstruct access to a button, port, or other feature of the product 102, 103. For example, one of the arms 136 may be positioned to obstruct access to a card slot 142 of the product 103, as shown in the example of FIG. 2. The card slot 142 may be a SIM card slot. Prohibiting access to the SIM card or other slot may be useful while the product 103 is secured by the cradle assembly 124. Additional, fewer, or alternative slots or ports, such as a memory card slot, may be obstructed.

As best shown in FIG. 2, the sliding plates 128-130 may be disposed on opposed sides of the base plate 126. In this example, the pair of lateral plates 128, 129 are disposed on, and slides along, a front face 144 (FIG. 3) of the base plate 126. The top plate 130 is disposed on, and slides along, a rear face 146 (FIG. 2) of the base plate 126. The base plate 126 may or may not be disposed between the respective plates of the plates 128-130 in other cases. For instance, all of the plates 128-130 may be disposed on, and slide along, the front face 144 in other cases.

The plates 128-130 are secured to the base plate 126 via a number of fasteners. In the example shown, the fasteners extend through slots or other holes in the plates. The holes are shaped or otherwise configured to facilitate the positioning of the plates 128-130 relative to the base plate 126. In the example of FIGS. 3 and 4, each lateral plate 128, 129 includes a slot 147. Each slot 147 may be notched as shown to define a number of discrete positions for the plate 128, 129. In this case, each slot 147 is oriented along the lateral axis 132. In other cases, each slot 147 is oriented at an angle to the lateral axis 132. An angled orientation may be used to increase the amount of allowable displacement the lateral plates 128, 129, thereby accommodating wider products.

As shown in FIGS. 3 and 4, screws 148 are used to secure the lateral plates 128, 129 to the base plate 126. Access to the screws 148 is limited when the product 102, 103 is disposed in the apparatus 100. The screws 148 are covered by the product 102, 103 when the product 102, 103 is disposed in the apparatus 100. Other fasteners may be used, including, for instance, pins or rivets.

The slots 147 allow the pair of lateral plates 128, 129 to move along the lateral axis 132 (FIG. 4) in order to accommodate a width or other lateral dimension of the product 102, 103. In this case, the dimension is a width of the product 102, 103. For example, FIG. 1 shows the lateral plates 128, 129 accommodating a narrower product 102, in which case the base plate 126 protrudes beyond the lateral plates 128, 129. FIG. 2 shows the lateral plates 128, 129 accommodating a wider product 103, where the lateral plates 128, 129 have been displaced outward. The lateral plates 128, 129 thus protrude beyond the base plate 126. The lateral plates 128, 129 accommodate products of different widths in this manner.

The base plate 126 has a number of holes or other openings in which the screws 148 are received. In this example, the base plate 126 has tapped holes 150 to accept the screws 148, as shown in FIG. 3. The location of the tapped holes 150 allows the screws 148 to be covered by the product 102, 103, as shown in FIGS. 1 and 2. The tapped holes 150 may also be created using a threaded insert nut pressed into holes in the base plate 126. The screws 148 may be counter-sunk screws.

The top plate 130 may include a number of holes or other openings to facilitate the fastening of the top plate 130 to the base plate 126. In this case, the top plate 130 includes a slot 152, as shown in FIGS. 3 and 4. The slot 152 may be notched to define a number of discrete positions for the top plate 130. The slot 152 may be oriented along the lateral axis 134 (FIG. 4) to accommodate a height or other lateral dimension of the product. As described below, the fastening mechanism for the top plate 130 may be or include a lock of the apparatus 100. In other cases, screws or other fasteners may be used to secure the top plate 130. Alternatively or additionally, a locking mechanism may be used in connection with one or both of the lateral plates 128, 129.

As shown in FIGS. 3 and 4, the base plate 126 has one or more openings directed to securing the top plate 130. In this example, the base plate 126 has a lock opening 154. The lock opening may be configured to receive one or more components of a lock, such as a lock housing. Additional or alternative openings may be provided. For instance, the base plate 126 may have one or more screw holes.

The top plate 130 may be configured to engage components of the assembly in addition to the base plate 126. In the example shown, the top plate 130 is configured to also engage a lock of the apparatus 100. As best shown in FIG. 3, the top plate 130 has a narrowed section extending downward from a wider section that carries the bracket arms 140. In this example, sides of the top plate 130 are bent outward to form a pair of guide flanges 160. Each guide flange 160 is configured to slidably engage a component of the apparatus 100. In this case, the component is a lock mount (e.g., a sidewall of a lock mount), which is described in greater detail below. The guide flanges 160 guide the top plate 130 to move along the lateral axis 134 (FIG. 4).

Soft sponge or rubber bumpers or other materials may be provided on one or more surfaces of the plate assembly 124. The bumpers may protect the product 102, 103 from getting scratches and other damage. In the example shown, bumpers are provided on front facing surfaces of the lateral plates 128, 129. Further bumpers are provided on inward surfaces of the arms 140. Additional, fewer or alternative bumpers may be provided.

The plate assembly 124 may be disassembled to provide further adjustability. One or more of the plates may be replaced with plates of differing size or shape. The difference in size or shape may be useful to accommodate a greater range of product sizes and shapes.

The positioning, orientation, and other aspects of the plate arrangement may vary from the example shown. For instance, the pair of lateral plates may slide along the lateral axis 134 in other cases.

The composition of the components of the cradle assembly 124 may be similar to the composition of the post 106. For instance, one or more components of the cradle assembly 124 may be composed of tamper-proof, heat treated steel. The respective bracket or other arms of the plates 128-130 may be integrally formed with the remainder of the respective plate. Alternatively, the arms may be connected or otherwise formed using fully-welded construction without any breaks or weak points. Other techniques to prevent tampering may be used. Other rugged materials may be used as described above.

Figure 5:
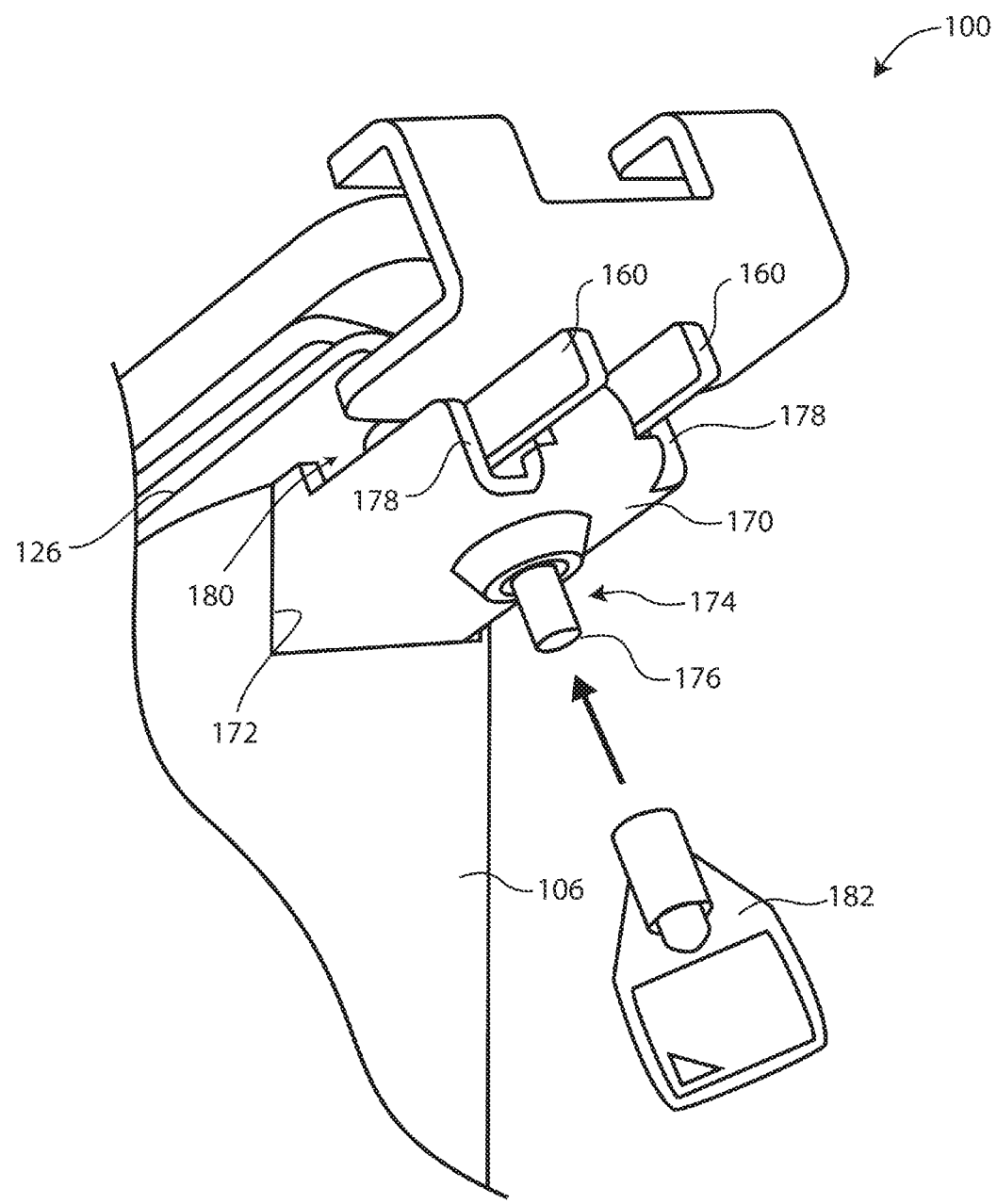
FIG. 5 is a rear, perspective, detailed view of the apparatus of FIG. 1 to depict in greater detail a spring-loaded push pin lock of the apparatus in accordance with one example.

FIG. 5 shows the apparatus 100 in greater detail to depict a lock mechanism. In this example, the apparatus 100 includes a lock mount 170 to support the lock mechanism. The lock mount 170 may be fixedly secured to, and extend outwardly from, the base plate 126 and/or the post 106. In the example shown, the lock mount 170 is welded to both the base plate 126 and the post 106. The welding of the post 106 and the lock mount 170 may be facilitated by a notch 172 at the upper end of the post 106. The notch 172 is also shown in FIG. 3. The notch 172 allows the lock mount 170 to extend into the post 106. The lock mount 170 extends rearwardly from the notch 172 and the post 106 as shown.

An example of the lock mount 170 is also shown in the exploded view of FIG. 3. The shape and other characteristics of the lock mount 170 may vary from the example shown.

The lock mount 170 may be directly or indirectly fixed to the base plate 126 and/or the post 106. For example, one or more intervening components may be disposed between the lock mount 170 and the post 106 to provide additional space between the base plate 126 and the lock mount 170 for the top plate 130.

The apparatus 100 further includes a lock 174 disposed in the lock mount 170. The lock 174 may be disposed in respective openings in the base plate 126 and the lock mount 170. In this example, the lock 174 engages the top plate 130 to fasten the top plate 130 to the base plate 126. The lock 174 may include a spring-loaded push pin 176 that engages the top plate 130 when pushed into the lock 174. The lock 174 thus locks the top plate 130 into position with the base plate 126.

The lock mount 170 may include one or more sidewalls 178. In the example shown, the lock mount 170 includes a pair of sidewalls 178. As shown in FIG. 5, the sidewalls 178 engage the guide flanges 160 of the top plate 130 to guide the top plate 130.

The sidewalls 178 may be welded or otherwise secured to the base plate 126. However, in the example of FIG. 5, each sidewall 178 has a portion spaced from the base plate 126 to define a gap 180 in which the top plate 130 is disposed. The gap 180 allows the top plate 130 to slide relative to the base plate 126 between the lock mount 170 and the base plate 126.

The lock mount 170 may be welded to the tube 107 and/or the base plate 126 using fully-welded construction without any breaks or weak points, thereby preventing tampering or removal of the product 102, 103. The lock mount 170 may be constructed and composed as described above in connection with other components of the apparatus 100.

FIG. 5 shows the apparatus 100 in greater detail to depict the operation of the lock 174. In some cases, a key 182 is used to disengage and engage the lock 174. In the example shown, the key 182 has a cylindrical end that engages a circular opening in an outward face of the lock 174. The configuration of the lock 174 may vary considerably from the example shown. For instance, the lock 174 may have a non-circular opening. The shape of the key 182 may vary accordingly.

In the example shown, the lock 174 is configured as, or includes, a barrel lock. The key 182 may thus be configured as, or include, a barrel lock key. The mechanical barrel lock displaces the spring-loaded push pin 176 to unlock the top plate 130 for product removal. The mechanical barrel lock secures the top plate 130 to prevent the product 102, 103 from being removed from the display fixture 104. Additionally, the barrel lock key is not easily reproducible and is available with many unique "codes," enhancing the security of the barrel lock. When using a unique code, each barrel lock in a location may be keyed the same, thereby allowing a single key to release each product 102, 103 at the location.

Alternatively, different keys may be provided for each product, or for different groups of products.

FIG. 5 depicts the lock 174 in an unlocked state. In that state, the spring-loaded push pin 176 extends outward from the lock 174 when the lock 174 resides in an unlocked state. FIG. 2 depicts the lock 174 in a locked state. In that state, the push pin 176 extends through the lock mount 170, the opening 154 in the base plate 126, and the slot 152 in the top plate 130. The top plate 130 is accordingly held in place relative to the base plate 126.

The spring-loaded push pin 176 provides for a quick connect feature, thereby allowing for easy product attachment and security. For example, by using the spring-loaded push pin 176, no keys or tools are required to secure the product into the apparatus 100. In the example shown, securing the product 102, 103 starts with sliding the lateral plates 128, 129 (FIGS. 1-3) inward until the sides and bottom of the product 102, 103 are engaged. The product 102, 103 may then be removed temporarily to tighten the screws 148 (FIG. 3). After the product 102, 103 is returned to the cradle, a user then slides the top plate 130 downward until the top side of the product is engaged. The spring-loaded push pin 176 is then pushed in to secure the top plate 130 without a key or other tool. The spring-loaded push pin 176 fits into one of the holes in the notched slot 152 of the top plate 130 to lock the top plate 130 into position. Once the spring-loaded push pin 176 is pushed in, the product 102, 103 is secured.

Removal of the product 102, 103 from the apparatus 100 is also facilitated by the lock 174. In the example shown, the lock 174 supports a quick disconnect feature. In this case, the lock 174 releases the top plate 130 to allow the product 102, 103 to be removed. The lock 174 is released with the key 182 that disengages the spring-loaded push pin 176 from the top plate 130. Once unlocked, a user can slide the top plate 130 outward, thereby allowing the product 102, 103 to be removed from the cradle assembly 124.

Other types of pins may be used. For instance, the spring-loaded push pin 176 may be replaced with a conventional locking pin or an electronically locking pin to secure the device.

Other aspects of the lock 174 may also vary. For instance, the lock 174 may be a mechanical or electrical lock. In such cases, a battery or AC powered electric actuator may be used to read an electronic key (not shown) and displace the spring-loaded push pin 176 to unlock the top plate 130. For instance, the electronic key may be or include a serial iButton Sennco "DA" key, an RFID tag, or another electronically readable key. The electronic key may be configured in accordance with one of millions of different key codes and may be learned or otherwise paired with an electric lock mechanism.

In one example, the lock 174 is centered on the cradle assembly 124, allowing for ambidextrous operation. The lock 174 however may be located anywhere on the cradle assembly 124.

As discussed above, all or part of the apparatus 100 may be constructed of tamper-proof, heat treated steel. For example, the cradle assembly 124, the lock mount 170, and the post 106 may be composed of tamper-proof, heat-treated steel. In this case, the steel is stress relieved to achieve a resultant hardness of 42-45 HRC after the parts are formed and/or welded.

Figure 6:
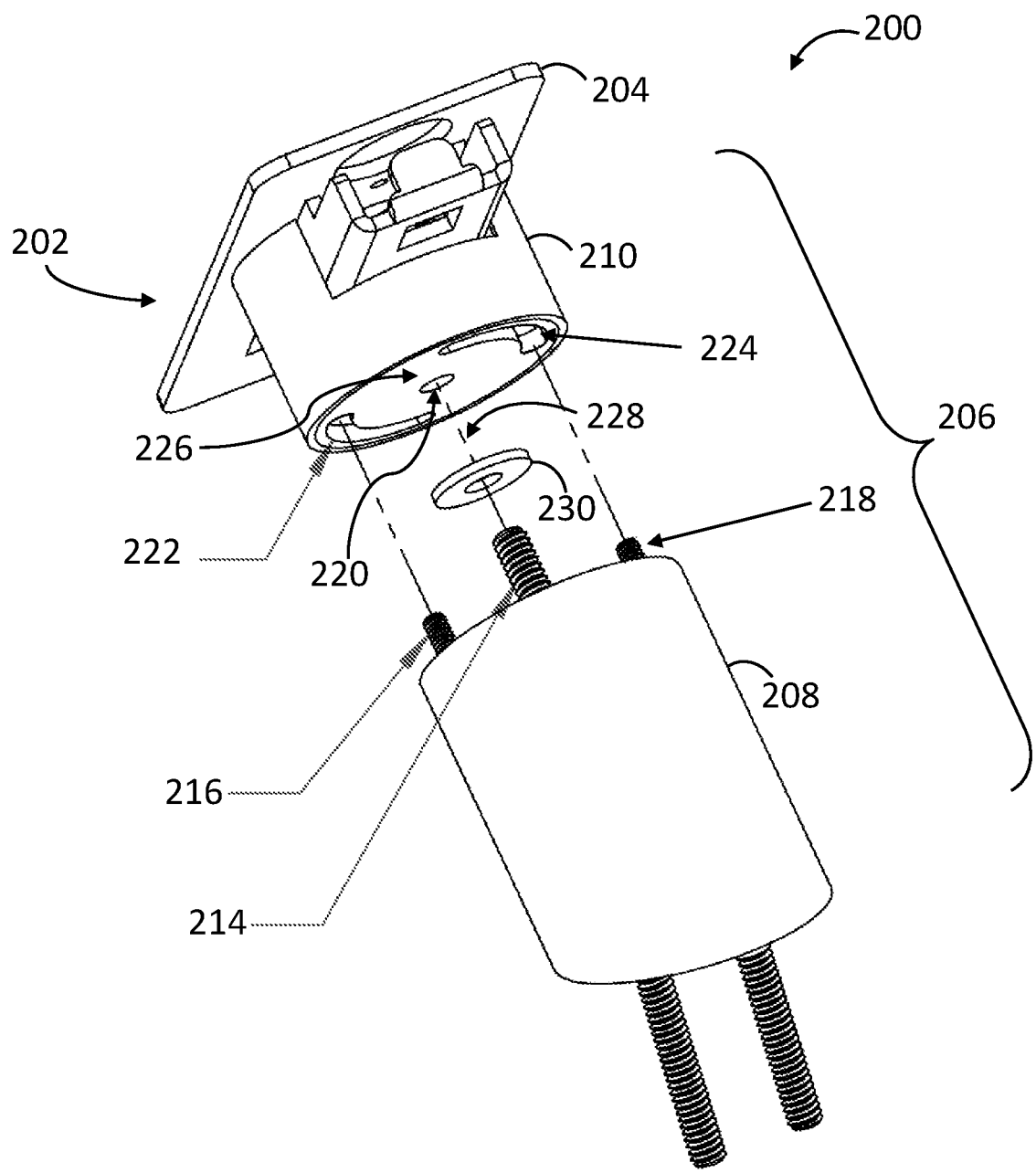
FIG. 6 is a rear, perspective, exploded view of an apparatus for securely displaying a product including a rotating post in accordance with one example.

FIG. 6 depicts an apparatus 200 configured for securely displaying a product in accordance with another example. Several aspects of the apparatus 200 may be configured similarly to the examples described above. For instance, the product may be securely displayed via a cradle assembly 202 with a sliding plate arrangement to engage the product, as described above. The cradle assembly 202 accordingly includes a base plate 204 and a number of plates slidably engaged with the base plate 204. The base plate 204 and the other plates slidably engaged with the base plate 204 may be configured as described above, except as otherwise noted below.

The apparatus 200 differs from the above-described examples insofar as the apparatus 200 includes a number of components directed to allowing rotation of the product. The rotation of the product may be useful in the retail environment if, for instance, a customer wishes to re-orient the product. For example, the product may be rotated between a portrait orientation and a landscape orientation. The extent or type of rotation or re-orientation may vary.

The apparatus includes a post 206 split into multiple sections, one of which being fixedly connected to the base plate 204. In this example, the post 206 includes a lower section 208 and an upper section 210. The upper section 210 is connected to the base plate 204. Additional sections may be provided in other cases. The sections 208, 210 are allowed to rotate relative to one another, as described below. The cradle assembly 202 and, thus, the product can be rotated while the product remains engaged with, and secured by, the apparatus 200. The rotation may be established about a single central bolt or other projection, and be stopped or otherwise limited by one or more further projections captured in one or more corresponding channels, as described below.

The lower and upper sections 208, 210 include one or more projections and one or more guides to control (e.g., limit) the rotation of the sections 208, 210 relative to one another. Each projection is aligned with, and disposed in, a respective one of the guides to control the rotation of the first and the second sections 208, 210 relative to one another. The cradle assembly 202 may thus be rotated, for example, to re-orient the product, e.g., from a portrait orientation to a landscape orientation.

In the example of FIG. 6, the lower section 208 each of the projections, and the second section 210 includes each one of the guides. The lower section 208 includes multiple projections 214, 216, 218, and the upper section 210 includes multiple guides 220, 222, 224. In other cases, the locations of the projections and the guides may be reversed or otherwise distributed amongst the sections 208, 210. The projections may or may not be provided on the same section. For instance, the section 208 may include one of the projections, while the section 210 may include the other projection(s).

Each projection 214, 216, 218 is fixedly secured to the section 208. For example, the projections 214, 216, 218 may be welded to the section 208. Alternative or additional mounting arrangements may be used.

Each guide 220, 222, 224 is or includes a hole or other opening in an end plate 226 of the section 210. The end plate 226 may be welded or otherwise fixedly secured to the remainder of the section 210. The size and shape of each opening is configured to receive and control the movement of the corresponding projection therein.

In the example of FIG. 6, the projection 214 and the guide 220 define an axis of rotation 228. The guide 220 is or includes a circular hole in which the projection 214 is received. The section 210 may thus be rotated about the axis of rotation 228 relative to the section 208. In this case, the projection 214 and the guide 220 do not otherwise limit the rotation.

Further limitation or control of the rotation is provided by the other projection-guide pairs, i.e., the projections 216, 218 and the guides 222, 224. In this example, each of the guides 222, 224 is or includes a channel or other slot in which the projections 216, 218 travel. Each channel defines an arc having a length that limits the extent of the rotation. For example, the guides 222, 224 may have an arc length that limits the range of rotation to approximately 90 degrees in either direction (clockwise and counterclockwise). The product may thus be rotated between portrait and landscape orientations. Other rotational ranges may be provided.

The configuration of the projections 214, 216, 218 and the guides 220, 222, 224 may vary. For instance, the projection 214 may include a bolt or pin. In this example, the projection 214 is threaded. The guide 220 may be threaded or otherwise include a threaded component, such as a sleeve, within the section 210. The projection 214 may be a threaded bolt for threaded engagement with the section 210. The other projections 216, 218 may be or include unthreaded pins or studs.

The number of projections and guides may vary from the example shown. For instance, in some cases, only a single, central projection-guide pairing may be included. In other cases, the single pairing may be configured as a pin traveling within a channel. In still other cases, a central pairing may be provided along with a single pin-channel pairing.

The shape and other characteristics of the sections 208, 210 and constituent elements thereof may vary. For example, the sections 208, 210 may have a cross-sectional shape differing from the cylindrical cross-section shown in FIG. 6.

The apparatus 200 may include one or more washers 230, 232 (FIG. 7), 234 (FIG. 7) to facilitate the rotational engagement of the sections 208, 210. Each washer 230, 232, 234 engages the central projection 230. Each washer 230, 232, 234 is thus disposed along the end cap 226 about the guide 220. Fewer, additional, or alternative washers or other fastening elements may be provided in other cases.

The washers 230, 234 (FIG. 7) may be composed of a material, or be otherwise configured, to establish a level of resistance, e.g., friction, for the rotation. For example, the washers 230, 234 may be composed of, or otherwise include, polytetrafluoroethylene (PTFE, or available commercially under Teflon™ and other trade names) and/or other materials that provide a non-sticking surface. The washers 230, 234 may be alternatively or additionally treated with a lubricant. Providing a desired level of resistance (e.g., friction) allows the rotation of the sections 208, 210 to be smooth rather than abrupt.

Figure 7:
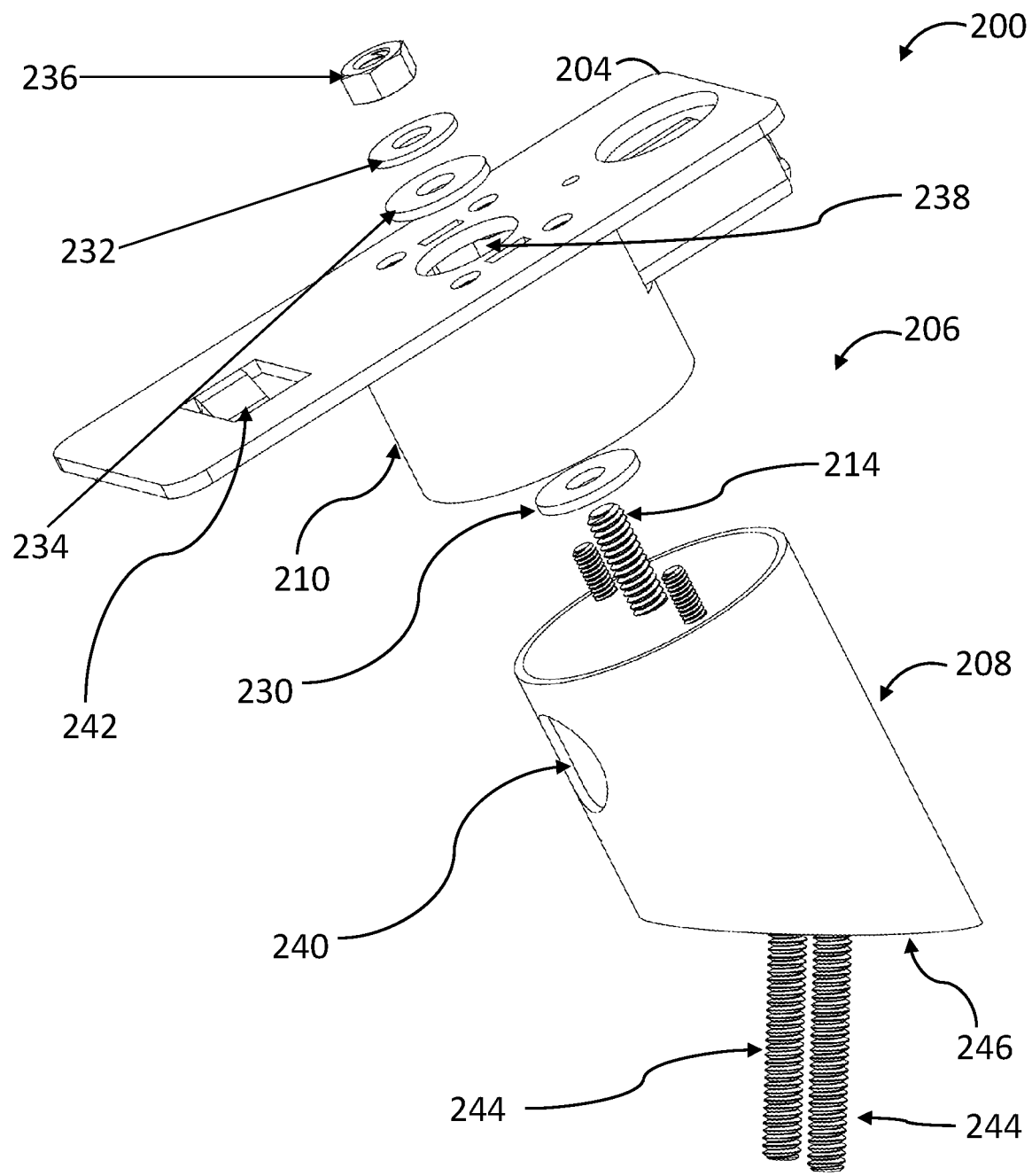
FIG. 7 is a side, perspective, exploded view of the apparatus of FIG. 6 to depict in greater detail a rotating post in accordance with one example.

In the example of FIGS. 6 and 7, the washer 230 is combined with the other washer 234 (FIG. 7) on the other side of the end cap 226 to form a sandwich arrangement. The washers 230, 234 may be configured similarly such that the desired amount of resistance (e.g., friction) to rotation is established on both sides of the end cap 226. Establishing the desired amount of resistance on both sides, in turn, allows the sections 208, 210 to be secured to one another via a fastener, as described below in connection with FIG. 7.

FIG. 7 is an exploded view of the apparatus 200 to depict the assembly of the apparatus 200 in greater detail. The apparatus 200 may include one or more fasteners for securing the sliding plates to the post while still permitting rotation. In this example, the apparatus 200 includes additional washers 232, 234, and a locking nut 236. The washers 232, 234 and the nut 236 are disposed in the upper section 210 along an interior face of the end plate 226 (FIG. 6). In other cases, the fasteners are disposed in the lower section 208. The washers 232, 234 and the nut 236 are engaged by the projection 210. One or both of the washers 232, 234 may be configured to establish a resistance (e.g., friction) level for the rotation, as described above. In this example, the washer 232 has a flat configuration, but may have a split ring, a star, or other configuration in other cases. The washer 232 may be composed of, or otherwise include, a metal, such as zinc.

The locking nut 236 is engaged with the projection 214 to fasten the sections 208, 210 one another. The nut 236 be tightened to a torque level to establish an amount of pressure appropriate for the desired resistance or friction level. One or more washers may be used to secure the nut 236 in place despite the rotation.

As shown in FIG. 7, the base plate 204 include an opening 238 aligned with the bolt 210 disposed in center of the first section 201. The base opening 236 to provide access to the above-described fastener elements.

The apparatus 200 may be configured to facilitate electrical, data or other connections to the product despite the separation of the post into the sections 206, 208. In this example, the lower section 208 includes a cord feed hole 240 to allow a cable to be connected to the product. After exiting the cord feed hole 240, the cable may be disposed in a cable hook 242 disposed in the base plate 204.

The apparatus 200 may include additional components directed to securing the sections 208, 210 to a permanent fixture. For instance, the section 208 may be secured by one or more security bolts 244. The security bolts 244 protrude from a lower end of the section 208. The lower end of the section 208 may have a slanted surface 246 to orient the apparatus 200 at an angle.

Described above is an apparatus for providing a heavy-duty mounting for securing a product to a display fixture in all three axes (X, Y, and Z). The apparatus includes a cradle assembly for receiving the product, the cradle assembly configured to secure each side of the product and a post configured to support the cradle assembly. A nut may be used to secure the post to a display, where the nut has a washer configured to accept set screws to prevent removal of the nut. The cradle assembly may be configured to adjust to a width and height of a product using adjustable plates. In some cases, the cradle assembly is secured by a lock using a spring-loaded pin that may be engaged without a key or tool. The cradle assembly and the post may be made from fully-welded, heat treated steel.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An apparatus for securely displaying a product, the apparatus comprising:
   a cradle assembly comprising a base plate and a plurality of plates slidably engaged with the base plate, each plate of the plurality of plates comprising an arm to engage a respective side of the product; and
   a post supporting the cradle assembly, the post comprising first and second sections, one of the first and second sections being fixedly connected to the base plate, the other of the first and second sections being allowed to rotate relative to the one of the first and second sections fixedly connected to the base plate;

wherein:
the first section comprises a projection;
the second section comprises a guide in which the projection is disposed to control rotation of the first and second sections relative to one another and re-orient the cradle assembly; and
the first and second sections are cylindrical; and wherein:
the projection is a first projection of a plurality of projections of the first section;
the guide is a first guide of a plurality of guides of the second section; and
each projection of the plurality of projections is disposed in a respective guide of the plurality of guides to control the rotation.

2. The apparatus of claim 1, wherein:
the projection comprises a pin, the pin defining an axis of the rotation; and
the guide comprises a hole in the second section in which the pin is disposed.

3. The apparatus of claim 2, wherein the pin comprises a threaded bolt.

4. The apparatus of claim 1, wherein:
the projection comprises a stud; and
the guide comprises a channel in the second section in which the stud travels during the rotation.

5. The apparatus of claim 1, wherein the plurality of guides comprise a slot in which one of the plurality of projections is disposed.

6. The apparatus of claim 5, wherein the slot is curved to define an arc that restricts the rotation to a predetermined range.

7. The apparatus of claim 5, wherein the slot is configured to re-orient the cradle assembly such that the product can rotate between a portrait orientation and a landscape orientation.

8. An apparatus for securely displaying a product, the apparatus comprising:
a cradle assembly comprising a base plate and a plurality of plates slidably engaged with the base plate, each plate of the plurality of plates comprising an arm to engage a respective side of the product; and
a post supporting the cradle assembly, the post comprising first and second sections, one of the first and second sections being fixedly connected to the base plate, the other of the first and second sections being allowed to rotate relative to the one of the first and second sections fixedly connected to the base plate;
wherein:
the first section comprises a projection;
the second section comprises a guide in which the projection is disposed to control rotation of the first and second sections relative to one another and re-orient the cradle assembly; and
the first and second sections are cylindrical; and
wherein the second section comprises an end cap in which the guide is formed.

9. The apparatus of claim 1, wherein the base plate is welded to the second section.

10. An apparatus for securely displaying a product, the apparatus comprising:
a cradle assembly comprising a base plate and a plurality of plates slidably engaged with the base plate, each plate of the plurality of plates comprising an arm to engage a respective side of the product;
a post supporting the cradle assembly, the post comprising first and second sections, one of the first and second sections being fixedly connected to the base plate; and
a washer disposed between the first and second sections and engaged by the projection, wherein the washer is configured to establish a friction level for the rotation;
wherein:
the first section comprises a projection;
the second section comprises a guide in which the projection is disposed to control rotation of the first and second sections relative to one another and re-orient the cradle assembly; and
the first and second sections are cylindrical.

11. An apparatus for securely displaying a product, the apparatus comprising:
a cradle assembly comprising a base plate and a plurality of plates slidably engaged with the base plate, each plate of the plurality of plates comprising an arm to engage a respective side of the product; and
a post supporting the cradle assembly, the post comprising first and second sections, one of the first and second sections being fixedly connected to the base plate;
wherein:
the first section comprises a projection;
the second section comprises a guide in which the projection is disposed to control rotation of the first and second sections relative to one another and re-orient the cradle assembly;
the first and second sections are cylindrical;
the first section comprises a bolt that defines an axis of the rotation; and
the apparatus comprises a nut disposed in the second section for threaded engagement with the bolt.

12. The apparatus of claim 11, further comprising a washer disposed between the nut and the second section to establish a friction level for the rotation.

13. An apparatus for securely displaying a product, the apparatus comprising:
a cradle assembly comprising a base plate and a plurality of plates slidably engaged with the base plate, each plate of the plurality of plates comprising an arm to engage a respective side of the product; and
a post supporting the cradle assembly, the post comprising first and second sections, the first section being allowed to rotate relative to the second section, the second section being fixedly connected to the base plate;
wherein:
the first section comprises a pin and a projection;
the second section comprises a hole in which the pin is disposed to define an axis of rotation of the first and second sections relative to one another for re-orientation of the cradle assembly;
the second section comprises a guide in which the projection is disposed to limit the rotation; and
the first and second sections are cylindrical; and
wherein the second section comprises an end cap in which the hole and the guide are formed.

14. The apparatus of claim 13, wherein the guide comprises a curved slot that defines an arc that restricts the rotation to a predetermined range.

15. The apparatus of claim 14, wherein the slot is configured to re-orient the cradle assembly such that the product can rotate between a portrait orientation and a landscape orientation.

16. The apparatus of claim 13, wherein the pin comprises a threaded bolt.

17. An apparatus for securely displaying a product, the apparatus comprising:
- a cradle assembly comprising a base plate and a plurality of plates slidably engaged with the base plate, each plate of the plurality of plates comprising an arm to engage a respective side of the product;
- a post supporting the cradle assembly, the post comprising first and second sections, the first section being allowed to rotate relative to the second section, the second section being fixedly connected to the base plate, wherein:
  - the first section comprises a pin and a projection;
  - the second section comprises a hole in which the pin is disposed to define an axis of rotation of the first and second sections relative to one another for re-orientation of the cradle assembly;
  - the second section comprises a guide in which the projection is disposed to limit the rotation;
  - the first and second sections are cylindrical; and
  - the pin comprises a threaded bolt; and
- a nut disposed in the second section for threaded engagement with the bolt.

* * * * *